United States Patent [19]
Wollenweber et al.

[11] Patent Number: 6,057,375
[45] Date of Patent: May 2, 2000

[54] USE OF ALKOXYLATION PRODUCTS OF EPOXIDIZED FATS AS ANTIFOAMING AGENTS

[75] Inventors: Horst-Werner Wollenweber, Duesseldorf; Klaus Hornfeck, Mettmann; Dieter Kaps, Leverkusen; Bernhard Nellessen, Kaarst; Rita Koester; Wolfgang Drees, both of Duesseldorf; Peter Daute, Beverstedt, all of Germany

[73] Assignee: Henkel Kommanditgesellschaft auf Aktien, Duesseldorf, Germany

[21] Appl. No.: 08/875,711

[22] PCT Filed: Jan. 23, 1997

[86] PCT No.: PCT/EP96/00257

§ 371 Date: Sep. 2, 1997

§ 102(e) Date: Sep. 2, 1997

[87] PCT Pub. No.: WO96/23568

PCT Pub. Date: Aug. 8, 1996

[30] Foreign Application Priority Data

Feb. 1, 1995 [DE] Germany .............................. 195 03 062

[51] Int. Cl.[7] .............................. B01D 19/04; D21H 21/12
[52] U.S. Cl. ...................... 516/133; 162/164.3; 426/329; 516/134
[58] Field of Search ..................................... 252/321, 358; 516/133, 134; 162/164.3; 426/329

[56] References Cited

U.S. PATENT DOCUMENTS

| | | | |
|---|---|---|---|
| 4,287,078 | 9/1981 | Langdon et al. | 252/321 X |
| 4,600,523 | 7/1986 | Piorr et al. | 252/321 X |
| 4,895,681 | 1/1990 | Herrmann et al. | 260/410.6 |
| 5,075,046 | 12/1991 | Stoll | 560/410.6 |
| 5,124,074 | 6/1992 | Uchiyama et al. | 252/321 X |
| 5,221,433 | 6/1993 | Daute et al. | 162/5 |
| 5,237,080 | 8/1993 | Daute et al. | 554/213 |
| 5,645,762 | 7/1997 | Cook et al. | 252/321 |

FOREIGN PATENT DOCUMENTS

| | | |
|---|---|---|
| 0 264 826 | 4/1988 | European Pat. Off. . |
| 38 15 826 | 11/1989 | Germany . |
| 39 23 393 | 1/1991 | Germany . |
| 39 23 394 | 1/1991 | Germany . |
| 40 38 608 | 6/1992 | Germany . |
| 43 31 229 | 3/1995 | Germany . |
| WO 93/24603 | 12/1993 | WIPO . |

OTHER PUBLICATIONS

Ross: "Mechanisms of Foam Stabilization and Antifoaming Action", *Chemical Engineering Progress* (vol. 63, No. 9) pp. 41–47, Sep. 1967.

Kirk–Othmer Concise Encyclopedia of Chemical Technology 325–26, 341, 415–417, 687–88, 1301, 1306 (1985).

Perry et al., Chemical Engineers' Handbook 18:93–96 (5th ed. 1973).

*Primary Examiner*—Richard D. Lovering
*Attorney, Agent, or Firm*—John E. Drach; Glenn E. J. Murphy

[57] ABSTRACT

A method of controlling or preventing foam in an aqueous system is provided, wherein an effective amount of an alkoxylated, epoxidized fatty compound that has been ring-opened with a nucleophile is determined and added to the system. After ring opening with the nucleophile, the epoxidized fatty compound is alkoxylated with an alkylene oxide selected from the group consisting of ethylene oxide, propylene oxide, and butylene oxide.

47 Claims, No Drawings

USE OF ALKOXYLATION PRODUCTS OF EPOXIDIZED FATS AS ANTIFOAMING AGENTS

This application is a U.S. national stage application filed under 35 U.S.C. §371, claiming priority of PCT/EP96/00257, filed Jan. 23, 1996, and DE 195.03 062.1, filed Feb. 1, 1995.

BACKGROUND OF THE INVENTION

1. Field of the Invention

This invention relates to the use of alkoxylation products of epoxidized fatty compounds as defoamers in papermaking, in the food manufacturing field, for example in the production of sugar or starch, in fermentation, in the dyeing of textiles and in paints.

2. Discussion of the Related Art

In a number of industrial processes, the foaming attributable to the presence or use of surface-active substances represents a serious problem.

In papermaking, troublesome foam can be formed by the air introduced into the water circuit. For example, foam spots can appear on the paper when foam containing floated soil passes onto the paper web in the sheet forming process. In view of the increasingly faster machine speeds, the overall danger of air entering the fiber suspension is also increasing. This can result in disruption of the drainage of the paper stock on the paper machine and ultimately in irregular structures within the paper sheet. These well-known disadvantages are made even worse by the new papermaking machines with their closed white water systems because foam-forming and foam-stabilizing substances accumulate in the closed systems. As the foregoing observations suggest, there is a considerable demand in the industry both for defoamers which are capable of reducing foam that has already formed and for foam inhibitors which suppress the formation of foam. Foam inhibitors are expected to show spontaneous and long-term activity in small amounts.

In the industrial manufacture or processing of foods, considerable significance is attached to the control and prevention of foaming. For example, in the industrial processing of sugar-containing plant juices which is practised on a large scale in the production of sugar from sugar beet, particular difficulties are caused by excessive foaming at the juice recovery and purification stage and in the evaporators. The foam control agents to be used in the sugar industry must of course be physiologically safe. The same applies to the foam control agents used in the manufacture of potato products, such as crisps or french fries, or even in the production of baker's yeast using molasses. In addition, the foam control agents used in the potato-processing industry must be capable of regulating the starch foam which is difficult to control. Overall, foam control agents are always expected to show high spontaneous and long-term activity in small amounts.

Fats and oils, such as rapeseed oil, peanut oil, olive oil and also wool grease, have long been used for controlling foam in the sugar and yeast industry. Synthetic esters, such as fatty acid monoglycerides and diglycerides, fatty acid polyglycol esters, and synthetic alcohols, such as polyalkylene glycols and alkylene oxide adducts with fatty alcohols, have also been proposed for this purpose. Although a certain foam-suppressing effect can be achieved with these compounds, the quantities required are often too high or, alternatively, effectiveness is only guaranteed at certain temperatures.

In the case of paints and lacquers, particularly those based on water as sole or predominant solvent, air can be stirred in through homogenization of the lacquer or paint components. This is a particular disadvantage because either the user has to wait a very long time for these air bubbles to burst before he can begin applying the lacquer or paint or the lacquer or paint coating contains small air bubbles. Coatings such as these with surface defects are not only visually unattractive, they do not last very long either because the bubbles can burst, leaving holes or weak spots in the film.

Numerous classes of compounds have already been proposed with a view to eliminating the problems caused by foam.

DE-A1 40 38 608 proposes ring opening products of epoxidized triglycerides as defoamers in the food industry.

According to DE-A1 38 15 826, epoxystearic acid methyl ester is subjected to a ring-opening reaction with carboxylic acids and the hydroxyl group formed is subsequently acylated with acetic anhydride. The document in question also relates to the use of this compound as a defoamer.

DE-A1 39 23 394 claims a process for alkoxylating ring-opened epoxidized fatty acid esters while DE-A1 39 23 393 relates to the use of these compounds for supporting the deinking of wastepaper.

Unpublished German patent application P 43 31 229.2 describes the use of block copolymers of epoxidized unsaturated carboxylic acids ring-opened with alcohols and polyethylene glycol as defoamers.

The problem addressed by the present invention was to provide a foam regulator which would be universally usable in water-containing systems with a tendency to foam and which would show good spontaneous activity in small quantities and would retain that activity for long periods. In addition, it would lend itself to "tailoring" in such a way that it would be effective even at low temperatures and would still develop its activity over a broad temperature range. In addition, the foam regulator would remain stable in storage and in its effect in admixture with other typical components of the water-containing systems to be defoamed and would not have any adverse effect on the medium to be treated or on the environment. For use in the paint and lacquer industry, the foam regulators would not only have a good defoaming effect, they would also enable paints and lacquers to be uniformly applied. The same also applies above all to the coating of paper which requires a homogeneous uniform coating with no surface defects.

It has now surprisingly been found that this problem can be solved by using ethoxylation products of epoxidized triglycerides ring-opened with fatty acids as defoamers.

3. Description of the Invention

The present invention relates to the use of alkoxylation products of epoxidized fatty compounds ring-opened with nucleophiles as defoamers.

In the context of the invention, epoxidized fatty compounds are understood to be olefinically unsaturated fatty acid esters or fatty alcohols or esters thereof of which the double bonds have been epoxidized to epoxide groups or oxirane rings. If these epoxide groups are reacted off with a nucleophile H—X, X is added to the epoxide ring to form an OH group. This OH group can be further reacted with alkylene oxides.

Suitable alkylene oxides are, for example, ethylene oxide, propylene oxide and butylene oxide. The OH groups formed are preferably reacted with ethylene and/or propylene oxide.

Examples of epoxidized fatty compounds are epoxidized triglycerides, epoxidized fatty acid esters of monohydric alcohols and epoxidized fatty alcohols or esters thereof, preferably with monobasic carboxylic acids.

Olefinically unsaturated fatty acids in the context of the invention are carboxylic acids containing 8 to 22 carbon atoms and 1 to 5 double bonds. The olefinically unsaturated fatty alcohols are derived from the olefinically unsaturated fatty acids by reduction of the carboxyl group.

Commensurate with their formation from natural fats and oils, fatty acids are mainly mixtures of various homologs. Accordingly, the epoxidized fatty compounds may also contain saturated fatty acids and fatty alcohols, preferably in quantities of no more than 35% by weight, based on the sum of saturated and unsaturated fatty compounds.

Suitable epoxidized triglycerides, i.e. epoxidized fatty acid glycerol esters, can be obtained from a number of triglycerides of vegetable or animal origin. For example, epoxidized triglycerides containing 2 to 10% by weight of epoxide oxygen are suitable. Products such as these can be obtained from a number of fats and oils by epoxidation of the double bonds, for example from beef tallow, palm oil, peanut oil, rapeseed oil, coriander oil, olive oil, fish oil, cottonseed oil, soybean oil, sunflower oil and linseed oil. Particularly preferred epoxidized triglycerides are epoxidized soybean oil and epoxidized linseed oil.

Epoxidized fatty acid esters of alcohols containing 1 to 4 carbon atoms, i.e. epoxidized fatty acid methyl, ethyl, propyl or butyl ester, are also suitable. Typical examples are the epoxides of palmitoleic acid methyl ester, oleic acid methyl ester, elaidic acid methyl ester, petroselic acid methyl ester, linoleic acid methyl ester, erucic acid methyl ester, oleic acid butyl ester or oleic acid i-butyl ester.

Epoxidized fatty alcohols containing 12 to 22 carbon atoms or esters thereof with—preferably—monobasic carboxylic acids, for example epoxidized acetic acid oleyl ester, oleic acid oleyl ester or erucic acid oleyl ester, are also suitable epoxidized fatty compounds.

Preferred nucleophiles which are required for the ring opening of the epoxide compounds are hydroxyfunctional compounds from the group consisting of water, monohydric alcohols, polyhydric alcohols and carboxylic acids.

The monohydric alcohols contain 1 to 54 carbon atoms. Typical examples are methanol, ethanol, 1-propanol, 2-propanol, n-butanol, pentanol, hexanol, 2-ethyl hexanol, fatty alcohols containing 6 to 22 carbon atoms, cyclohexanol, benzyl alcohol, octanol, decanol, lauryl alcohol, myristyl alcohol, cetyl alcohol, stearyl alcohol, oleyl alcohol, behenyl alcohol or erucyl alcohol or the dimer diols or trimer diols obtainable by hydrogenation from dimer/trimer fatty acid esters. Methanol and ethanol are preferably used.

The alkoxylation products of the above-mentioned alcohols with—preferably—up to 10 moles of alkylene oxide may also be used for the ring opening reaction.

The polyhydric alcohols preferably contain 2 to 8 hydroxyl groups. Examples of polyhydric alcohols are ethylene glycol, diethylene glycol, polyethylene glycols with molecular weights in the range from 300 to 1,500, propane-1,2-diol, propane-1,3-diol, butane-1,4-diol, hexane-1,6-diol, neopentyl glycol, glycerol, trimethylol ethane, oligoglycerols with degrees of condensation of on average 2 to 10, trimethylol propane, pentaerythritol, sorbitol and sorbitan.

The alkoxylation products of the above-mentioned alcohols with—preferably—up to 10 moles of alkylene oxide per hydroxyl group may also be used for the ring opening reaction.

Ethylene glycol, propane-1,2-diol, glycerol and trimethylol propane are preferred.

Preferred carboxylic acids contain 1 to 54 carbon atoms. Examples of carboxylic acids are formic acid, acetic acid, propionic acid, fatty acids containing 6 to 22 carbon atoms, dimer fatty acid, trimer fatty acid, ricinoleic acid, hydroxystearic acid and benzoic acid or mixtures thereof.

Mixtures of fatty acids containing 6 to 18 carbon atoms are preferred, mixtures of fatty acids containing 6 to 12 carbon atoms being particularly preferred.

The compounds from the group of epoxidized fatty compounds may be reacted with compounds from the group of nucleophiles. According to the invention, any combination is possible.

Certain combinations of epoxidized fatty compounds and nucleophiles represent preferred embodiments of the invention.

In one embodiment, epoxidized triglycerides or epoxidized fatty acid esters of monohydric alcohols are subjected to a ring-opening reaction with water and then alkoxylated.

In another embodiment, epoxidized triglycerides are reacted with monohydric alcohols and then alkoxylated.

Preferred alcohols are methanol and fatty alcohols containing 8 to 18 carbon atoms.

The ring opening reaction of epoxidized fatty acid esters or triglycerides with an alcohol may optionally be followed by a transesterification with the ring-opened triglycerides or fatty acid esters or with other subsequently added triglycerides, for example palm oil, peanut oil, rapeseed oil, cottonseed oil, soybean oil, sunflower oil and linseed oil.

In one preferred embodiment, epoxidized triglycerides are reacted with carboxylic acids and then alkoxylated.

Suitable carboxylic acids are mixtures of fatty acids containing 6 to 18 carbon atoms, preferably 6 to 12 carbon atoms, and also ricinoleic acid with hydroxystearic acid.

In another embodiment, epoxidized fatty acid esters are reacted with polyhydric alcohols and the resulting reaction product is subsequently alkoxylated. The ring opening and transesterification products with dihydric to tetrahydric alcohols, more particularly the reaction products with ethylene glycol, propylene glycol, oligomeric ethylene glycols, oligomeric propylene glycols, glycerol, trimethylol propane or pentaerythritol, are preferred for this purpose.

Preferred ring opening products are those in which a molar ratio between epoxidized fatty acid ester and the alcohol used for the reaction of 1:0.5 to 1:10 has been applied.

In another preferred embodiment, epoxidized fatty acid esters are reacted with carboxylic acids and the resulting reaction product is subsequently alkoxylated.

Suitable carboxylic acids are mixtures of saturated or unsaturated fatty acids containing 6 to 18 carbon atoms, preferably 6 to 12 carbon atoms, and also ricinoleic acid with hydroxystearic acid. Dimer fatty acid and trimer fatty acid are also suitable.

The epoxide compounds and the nucleophiles may be reacted with one another in molar ratios of 1:10 to 10:1 and preferably 1:3 to 3:1. It is particularly preferred, above all in the case of epoxidized fatty acid esters and/or dicarboxylic acids of polyhydric alcohols, to maintain a substantially equivalent ratio.

The ring opening products can have hydroxyl values of 20 to 400 and preferably in the range from 50 to 200.

The reactions of epoxidized fatty compounds with nucleophiles may be carried out at temperatures of 50 to 250° C.

and under pressures of $10^5$ to $10^6$ Pa. Ring opening reactions with alcohols are preferably carried out in the presence of acidic catalysts, such as sulfuric acid and/or p-toluene sulfonic acid.

The ring opening reaction may be carried out in known manner. It has proved to be of particular advantage to carry out the reaction at the boiling temperature of the nucleophile used or at a temperature of 50 to 250° C. under normal pressure. It is not absolutely essential for the ring opening reaction to be complete. On the contrary, it is even possible to prepare epoxide ring opening products which still have a certain residual epoxide oxygen content, for example of 1 to 3% by weight. The reaction times are generally between 1 and 6 hours. After the reaction, the catalyst can be removed by standard methods, for example by adsorption to a solid material, or may be left in the product after neutralization with alkalis, for example NaOH, KOH, LiOH or $Na_2CO_3$, or amines, such as ethanolamine, morpholine or ammonia.

Ring opening of the epoxidized fatty compounds with a nucleophile is followed by alkoxylation.

The alkoxylation step is carried out by known industrial methods with ethylene oxide, propylene oxide and/or butylene oxide, preferably with ethylene oxide and/or propylene oxide, preferably in the presence of catalysts, for example potassium hydroxide and/or sodium methylate, at temperatures of 110 to 200° C. and preferably at temperatures of 140 to 175° C. under pressures of $10^5$ to $2 \cdot 10^6$ Pa and preferably under pressures of $3 \cdot 10^5$ to $5 \cdot 10^5$ Pa. The alkylene oxide content is from 2 to 200% by weight, preferably from 20 to 100% by weight and more preferably from 40 to 80% by weight, based on the non-alkoxylated compounds.

A particularly preferred combination of epoxidized fatty compound, nucleophile and alkylene oxide is represented by epoxidized triglycerides, fatty acid mixtures of fatty acids containing 6 to 12 carbon atoms and ethylene oxide in quantities of 40 to 80% by weight, based on the non-alkoxylated compound.

The alkoxylation products to be used in accordance with the invention are liquid to highly viscous products which, in individual cases, may even be described as solid. When the alkoxylation products are added to foaming systems, a significant reduction in foaming occurs even in the presence of very small quantities. The alkoxylation products are suitable for reducing foam that has already formed and for preventively avoiding foaming. The alkoxylation products may be added to the systems either in pure form or even in the form of a solution or dispersion. If it is desired to use solutions or dispersions, a liquid organic medium, for example an alcohol, ester or methylene chloride, may be used. However, water may also be used as the solvent. If the alkoxylation products have high ethylene oxide contents, they are self-emulsifiable in water, i.e. they can be emulsified or dispersed in water without the addition of external emulsifiers. However, if the hydrophobic component is dominant in the alkoxylation products, either other solvents or external emulsifiers have to be used. Whether or not the alkoxylation products are self-emulsifiable should be determined by small-scale tests in which water is added to the substances and an attempt is made to form an emulsion or dispersion by stirring.

The alkoxylation products may be used in the paper industry in the manufacture of pulp, for example in the boiling of sulfite pulp, in paper production and in the coating of paper. They are preferably used in the production of paper. In addition, the alkoxylation products can be used in the food industry, in the production and processing of food, for example in the sugar industry in the soaking of beet and in the washing and chipping of sugar beet, in the extraction of sugar from the beet chips and in the subsequent treatment with milk of lime and also in the multistage evaporators in which water is removed until a crystal sludge oversaturated with sugar, the so-called magma, is formed. The alkoxylation products may also be used in the yeast industry in the industrial production of baker's yeast by fermentation. In this particular application, foam is formed in very large amounts, above all during the aerobic fermentation stage, and can be prevented or reduced by the alkoxylation products. The alkoxylation products may also be used in the processing of potatoes because they are capable of coping with the starch foam which is so difficult to control. The alkoxylation products may also be used without any problems in the paint and lacquer industry, i.e. above all they are capable of destroying the foam caused in particular by the introduction of air without in any way affecting the quality of the lacquers or paints. The quantity of alkoxylation products used varies according to the particular application. Basically, every effort should be made to use small quantities for economic reasons alone. In general, the alkoxylation products are used in quantities of 10 to 10,000 ppm.

In its most simple form, the use according to the invention may be achieved by adding an alkoxylation product of the type described above either as such, in the form of a solution in a preferably water-miscible organic solvent or in the form of an aqueous suspension or dispersion to a water-containing system which would tend to undergo undesirably intensive foaming without this addition. Besides those mentioned above, the water-containing systems with a tendency to foam which can be defoamed or foam-regulated with the alkoxylation products to be used in accordance with the invention also include aqueous textile dyeing or pretreatment baths, pulps for cellulose or paper manufacture and also the sugar-containing plant juices which accumulate in the food industry and in the processing of molasses or sugar beet.

In addition to the treatment of useful materials in the course of the processes mentioned thus far in the present specification, aqueous systems in the form of wastewaters, for example from one of the processes mentioned above, may also be defoamed in accordance with the invention. However, the defoamers according to the invention are by no means limited in their usefulness to wastewaters of this type. On the contrary, any form of water contaminated with organic foam-forming substances can be prevented from foaming excessively on agitation. Such agitation occurs, for example, in the treatment of wastewaters from one of the above-mentioned processes. However, the treatment of communal or agricultural wastewater can also be supported by the defoamers according to the invention.

The alkoxylation products may of course also be used in the form of mixtures with other defoaming compounds, for example fatty alcohols, oils and fats, partial glycerides, alkoxylation products of fatty acids and fatty alcohols, alkoxylation products of polyols and partial esters thereof, paraffins, fine-particle silicates and waxes.

EXAMPLES

In the following Examples, all percentages are by weight, unless otherwise indicated.

Example 1

Production of Ethoxylated Soybean Oil Epoxide Ring-Opened with Carboxylic Acids 126 kg (812 moles) of a mixture of saturated fatty acids (60% by weight octanoic acid, 35% by weight decanoic acid, 3% by weight dodecanoic acid and 2% by weight hexanoic acid; acid value 361.9, iodine value<1) and 180 kg (766 moles) of epoxidized soybean oil (6.8% by weight epoxide oxygen content) were introduced into a stirred tank reactor and heated with stirring to 170° C. When the reaction mixture contained no more epoxide groups (about 4 hours), it was distilled in vacuo up to about 190° C. A dark yellow liquid with an OH value of 84.6, a saponification value of 239 and an acid value of 2.4 was obtained.

6.9 g of a 30% by weight solution of potassium hydroxide in methanol were added to 423 g of the reaction product of soybean oil epoxide with carboxylic acids, followed by reaction with 660 g of ethylene oxide at 140° C. as in Example 1. After the removal of traces of ethylene oxide in vacuo and neutralization with lactic acid, a dark yellow liquid with an OH value of 54.7 was obtained.

Example 2
Production of Ethoxylated Soybean Oil Epoxide Ring-Opened with Lauryl Alcohol In a stirred tank reactor, 3.6 g of concentrated sulfuric acid were added to 474 g of soybean oil epoxide (characteristic data as in Example 1) and 745 g of lauryl alcohol, followed by heating to 100C. When the reaction mixture contained no more epoxide groups (about 3.5 hours), it was neutralized with 3.6 g of diethyl ethanolamine and the excess lauryl alcohol was distilled off in vacuo at 10 Pas/135° C. 723 g of a reaction product with an OH value of 112, an iodine value of 20, a saponification value of 116 and an acid value of 72 were obtained.

4.0 g of a 30% by weight solution of potassium hydroxide in methanol were added to 390 g of the reaction product of soybean oil epoxide with lauryl alcohol, followed by reaction with 610 g of ethylene oxide at 170° C. as in Example 1. After the removal of traces of ethylene oxide in vacuo and neutralization with lactic acid, a yellow paste was obtained.

Defoaming Test

Test Medium 80 parts of a bone-dry waste paper mixture consisting of:

20% of lightweight coated paper (catalogues)

40% of newspaper

40% of magazines

+20 parts of bone-dry groundwood pulp (bleached) ground to an SR freeness value of 60°

Production

The approximately 5% WP high-consistency pulp mixture (disintegrated for 10 minutes in a pulper) and the approximately 2% groundwood pulp (ground to 60° SR) are mixed in the above ratio after determination of the pulp consistency and, before the test, are diluted to a stock consistency of 1% with tap water at approximately the test temperature.

Test Conditions

This mixture is pumped into a vessel by a peristaltic pump, being intensively mixed in a nozzle with the air taken in. As a result, foaming occurs and, at the same time, air accumulates on the fibers present in the medium.

The relative height of the foam formed is read off from a scale graduated in millimeters.

5 kg test medium, 1% pulp consistency temperature variable between room temperature and about 90° C.

pump circulation at 4 l/minute air input 100 l/hour

Defoamer Addition

In the test, the defoamers are prediluted with water in a ratio of 1:10. The defoamers are added when the foam reaches a height of 200 mm (about 1 minute after the start of the test). The defoamers are added in the intake hose just before the peristaltic pump.

The defoaming effect (in %) is determined after 1 minute (spontaneous effect) and after 5 minutes (long-term effect). It may be calculated in accordance with the following formula:

$$100\% - \left(\frac{\text{Measured foam height in mm}}{200 \text{ mm}} \times 100\%\right)$$

The results are set out in Table 1.

TABLE 1

| | | | Defoaming Effect | |
|---|---|---|---|---|
| Defoamer | Quantity [μl]* | T [° C.] | Effect (after 1 min.) [%] | Effect (after 5 mins.) [%] |
| Ex. 1 | 200 | 45 | 100 | 25 |
| Ex. 1 | 400 | 45 | 100 | 35 |
| Ex. 1 | 200 | 55 | 95 | 5 |
| Ex. 1 | 400 | 55 | 100 | 15 |
| Ex. 1 | 200 | 60 | 90 | 0 |
| Ex. 1 | 400 | 60 | 100 | 20 |
| Comp. 1 | 200 | 45 | 90 | 10 |
| Comp. 1 | 200 | 55 | 70 | 0 |

Comp. 1 is an oleic-acid-esterified ethylene oxide/propylene oxide block copolymer according to EP-A-264 826.
*The quantity of defoamer added is based on a solution prediluted with water in a ratio of 1:10.

We claim:

1. A method of controlling or preventing foam in an aqueous system comprising the steps of determining an amount effective to control or prevent foam in the system of a compound prepared by alkoxylating an epoxidized fatty compound that has been ring-opened with a nucleophile with an alkylene oxide selected from the group consisting of ethylene oxide, propylene oxide, and butylene oxide, and adding to the system the determined effective amount of the compound.

2. A method according to claim 1, wherein the alkoxylation is carried out in the presence of a catalyst.

3. A method according to claim 2, wherein the catalyst is selected from the group consisting of potassium hydroxide and sodium methylate.

4. A method according to claim 1, wherein the alkoxylation is carried out at a temperature of 110° C. to 200° C. and a pressure of $10^5$ to $2 \times 10^6$ Pa, and the amount of alkylene oxide is 2% to 200% by weight, based on the weight of non-alkoxylated epoxidized fatty compound.

5. A method according to claim 4, wherein the alkoxylation is carried out at a temperature of 145° C. to 175° C. and a pressure of $3 \times 10^5$ to $5 \times 10^5$ Pa, and the amount of alkylene oxide is 20% to 100% by weight, based on the weight of non-alkoxylated epoxidized fatty compound.

6. A method according to claim 5 wherein the amount of alkylene oxide is 40% to 80% by weight, based on the weight of non-alkoxylated epoxidized fatty compound.

7. A method according to claim 1, wherein the epoxidized fatty compound is an epoxidized triglyceride, the nucleophile is a mixture of fatty acids, each of said acids containing 6 to 12 carbon atoms, and the amount of alkylene oxide is 40% to 80% by weight, based on the weight of non-alkoxylated epoxidized fatty compound.

8. A method according to claim 1, wherein the epoxidized fatty compound is selected from the group consisting of epoxidized triglycerides, epoxidized fatty acid esters of monohydric alcohols, epoxidized fatty alcohols, and epoxidized fatty alcohol esters.

9. A method according to claim 8, wherein the epoxidized fatty compound has 8 to 22 carbon atoms and 1 to 5 epoxide rings.

10. A method according to claim 8, wherein the epoxidized fatty compound is an epoxidized fatty alcohol ester of a monobasic carboxylic acid.

11. A method according to claim 8, wherein the epoxidized fatty compound is an epoxidized triglyceride derived by epoxidation of a fatty acid from a fat selected from the group consisting of beef tallow, palm oil, peanut oil, rapeseed oil, coriander oil, olive oil, fish oil, cottonseed oil, soybean oil, sunflower oil, and linseed oil.

12. A method according to claim 11, wherein the fat is selected from the group consisting of soybean oil and linseed oil.

13. A method according to claim 8, wherein the epoxidized fatty compound is an epoxidized fatty acid esters of a monohydric alcohol, said alcohol having 1 to 4 carbon atoms.

14. A method according to claim 13, wherein the epoxidized fatty compound is an epoxide of a compound selected from the group consisting of palmitoleic acid methyl ester, oleic acid methyl ester, elaidic acid methyl ester, petroselic acid methyl ester, linoleic acid methyl ester, erucic acid methyl ester, oleic acid butyl ester, and oleic acid i-butyl ester.

15. A method according to claim 8, wherein the epoxidized fatty compound is selected from the group consisting of epoxidized fatty alcohols and epoxidized fatty alcohol esters, said compound having 12 to 22 carbon atoms.

16. A method according to claim 15, wherein the epoxidized fatty compound is an epoxidized fatty alcohol ester of a monobasic carboxylic acid.

17. A method according to claim 16, wherein the epoxidized fatty compound is an epoxide of a compound selected from the group consisting of acetic acid oleyl ester, oleic acid oleyl ester, and erucic acid oleyl ester.

18. A method according to claim 1, wherein the nucleophile is a hydroxyfunctional compound selected from the group consisting of water, monohydric alcohols, polyhydric alcohols, and carboxylic acids.

19. A method according to claim 18, wherein the nucleophile is a monohydric alcohol containing 1 to 54 carbon atoms.

20. A method according to claim 19, wherein the nucleophile is selected from the group consisting of methanol, ethanol, 1-propanol, 2-propanol, n-butanol, pentanol, hexanol, 2-ethyl hexanol, cyclohexanol, benzyl alcohol, octanol, decanol, lauryl alcohol, myristyl alcohol, cetyl alcohol, stearyl alcohol, oleyl alcohol, behenyl alcohol, erucyl alcohol, dimer diols derived by hydrogenation of dimer fatty acid esters, and trimer diols derived by hydrogenation of trimer fatty acid esters.

21. A method according to claim 19, wherein the nucleophile is a fatty alcohol containing 6 to 22 carbon atoms.

22. A method according to claim 18, wherein the nucleophile is a polyhydric alcohol containing 2 to 8 hydroxyl groups.

23. A method according to claim 18, wherein the nucleophile is a polyhydric alcohol selected from the group consisting of ethylene glycol, diethylene glycol, polyethylene glycols of molecular weight 300 to 1500, propane-1,2-diol, propane-1,3-diol, butane-1,4-diol, hexane-1,6-diol, neopentyl glycol, glycerol, trimethylol ethane, oligoglycerols having an average degree of condensation from 2 to 10, trimethylol propane, pentaerythritol, sorbitol, and sorbitan.

24. A method according to claim 23, wherein the nucleophile is selected from the group consisting of ethylene glycol, propane-1,2-diol, and trimethylol propane.

25. A method according to claim 18, wherein the nucleophile is a carboxylic acid containing 1 to 54 carbon atoms.

26. A method according to claim 25, wherein the carboxylic acid is selected from the group consisting of formic acid, acetic acid, propionic acid, fatty acids containing 6 to 22 carbon atoms, dimer fatty acid, trimer fatty acid, ricinoleic acid, hydroxystearic acid, and benzoic acid.

27. A method according to claim 18, wherein the nucleophile is a mixture of fatty acids, each of said acids containing 6 to 18 carbon atoms.

28. A method according to claim 27, wherein the fatty acids contain 6 to 12 carbon atoms.

29. A method according to claim 1, wherein the epoxidized fatty compound is an epoxidized triglyceride or a fatty acid ester of a monohydric alcohol, and the nucleophile is water.

30. A method according to claim 1, wherein the epoxidized fatty compound is an epoxidized triglyceride, and the nucleophile is a monohydric alcohol.

31. A method according to claim 30, wherein the monohydric alcohol is selected from the group consisting of methanol and fatty alcohols containing 8 to 18 carbon atoms.

32. A method according to claim 1, wherein the epoxidized fatty compound is an epoxidized triglyceride, and the nucleophile is a carboxylic acid.

33. A method according to claim 32, wherein the carboxylic acid is a mixture of carboxylic acids, said acids each containing 6 to 18 carbon atoms.

34. A method according to claim 33, wherein said carboxylic acids each contain 6 to 12 carbon atoms.

35. A method according to claim 33, wherein the mixture of carboxylic acids is a mixture of ricinoleic acid and hydroxystearic acid.

36. A method according to claim 1, wherein the epoxidized fatty compound is an epoxidized fatty acid ester and the nucleophile is a polyhydric alcohol.

37. A method according to claim 36, wherein the molar ratio of epoxidized fatty acid ester to polyhydric alcohol is 1:0.5 to 1:10.

38. A method according to claim 1, wherein the epoxidized fatty compound is an epoxidized fatty acid ester, and the nucleophile is a carboxylic acid.

39. A method according to claim 38, wherein the carboxylic acid is a mixture of carboxylic acids, said acids each containing 6 to 18 carbon atoms.

40. A method according to claim 39, wherein said carboxylic acids each contain 6 to 12 carbon atoms.

41. A method according to claim 39, wherein the mixture of carboxylic acids is a mixture of ricinoleic acid and hydroxystearic acid.

42. A method according to claim 1, wherein the molar ratio of epoxidized fatty compound to nucleophile is 1:10 to 10:1.

43. A method according to claim 42, wherein the ratio is 1:3 to 3:1.

44. A method according to claim 1, wherein the epoxidized fatty compound and the nucleophile are reacted at a temperature of 50° C. to 250° C. and a pressure of $10^5$ to $10^6$ Pa for a period of 1 to 6 hours.

45. A method according to claim 44, wherein the reaction is carried out in the presence of a catalyst.

46. A method according to claim 45, wherein the catalyst is selected from the group consisting of sulfuric acid and p-toluene sulfonic acid.

47. A method of controlling or preventing foam in an aqueous system comprising the steps of:
   (a) determining an amount effective to control or prevent foam in the system of a compound prepared by:
      i. reacting an epoxidized fatty compound selected from the group consisting of epoxidized triglycerides, epoxidized fatty acid esters of monohydric alcohols, epoxidized fatty alcohols, and epoxidized fatty alcohol esters with a nucleophile selected from the group consisting of water, monohydric alcohols, polyhydric alcohols, and carboxylic acids to effect at least partial opening of the epoxide rings of the epoxidized fatty compound; and
      ii. alkoxylating the at least partially ring-opened epoxidized fatty compound with an alkylene oxide selected from the group consisting of ethylene oxide, propylene oxide, and butylene oxide; and
   (b) adding to the aqueous system the determined effective amount of the compound.

* * * * *